March 30, 1965 C. W. McCREERY 3,175,704
TRANSFER APPARATUS
Filed Nov. 13, 1962 7 Sheets-Sheet 1

INVENTOR.
C. WAYNE McCREERY
BY W. A. Schaich &
D. T. Innis
ATTORNEYS

March 30, 1965 C. W. McCREERY 3,175,704
TRANSFER APPARATUS

Filed Nov. 13, 1962 7 Sheets-Sheet 5

INVENTOR.
C. WAYNE McCREERY
BY W. A. Schaich +
D. T. Innis
ATTORNEYS

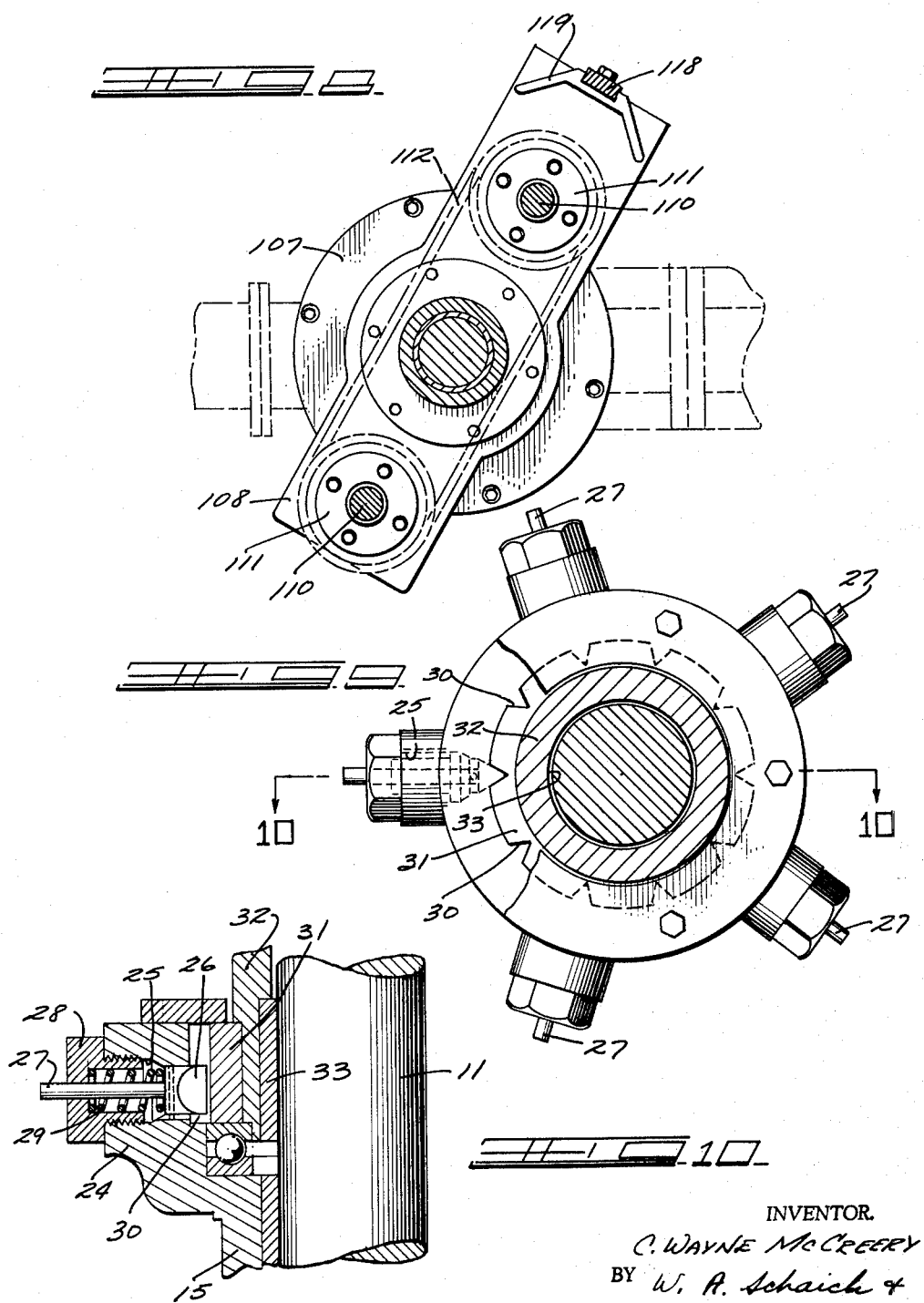

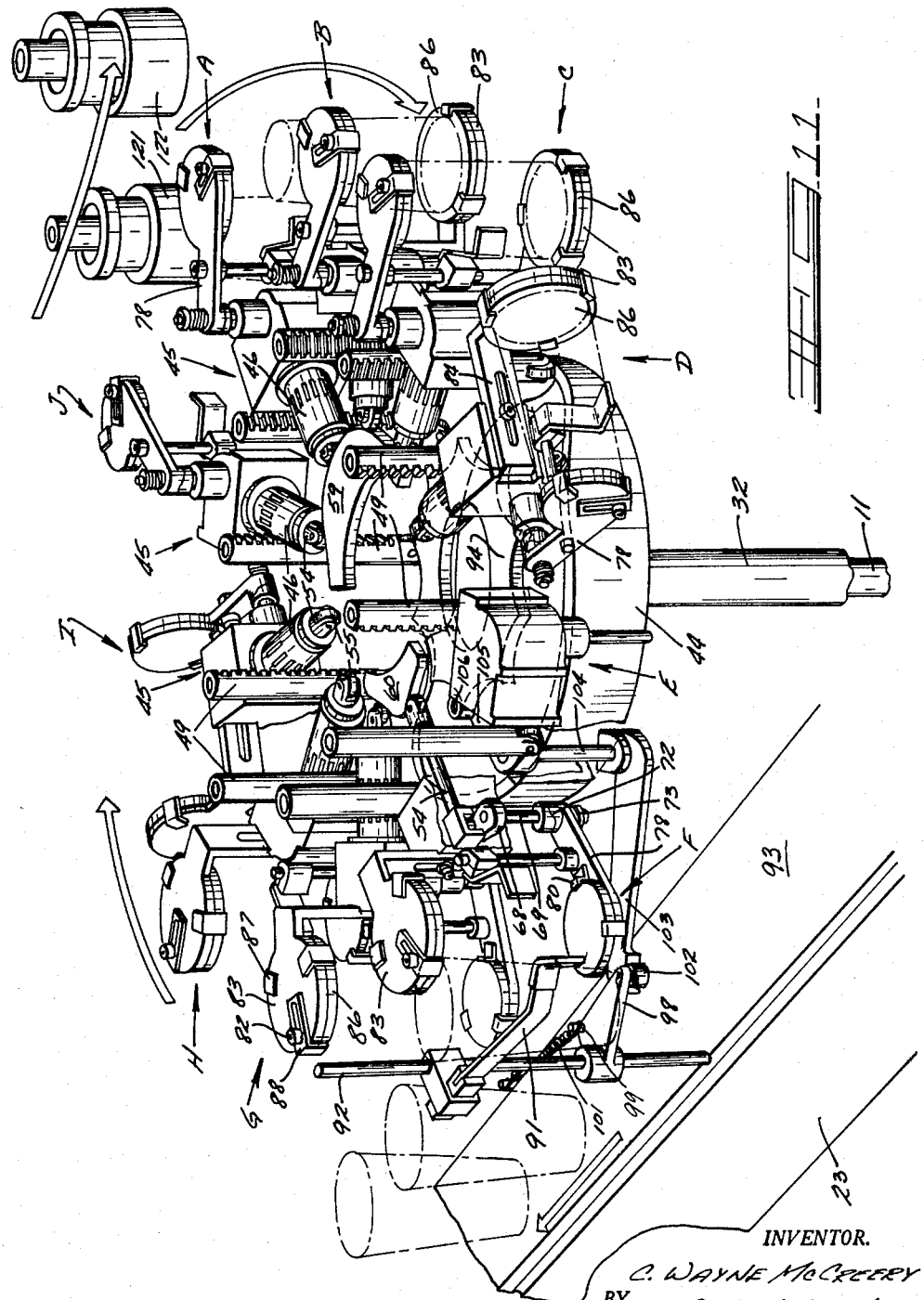

United States Patent Office 3,175,704
Patented Mar. 30, 1965

3,175,704
TRANSFER APPARATUS
Cecil Wayne McCreery, Toledo, Ohio, assignor to Owens-Illinois Glass Company, a corporation of Ohio
Filed Nov. 13, 1962, Ser. No. 236,912
19 Claims. (Cl. 214—1)

This invention relates to a method and apparatus for transferring glass articles from a burn-off machine to a conveyor. More particularly, this invention relates to a method and apparatus for receiving hot tumblers from a burn-off machine in an inverted position and transferring the hot tumblers to a conveyor while at the same time turning the tumblers end-for-end.

It has been the practice in the past to release hot tumblers from a burn-off machine onto what is termed a "peg table." For example, as shown in United States Patent 2,206,267, the ware was released from a burn-off chuck and dropped a relatively short distance over a vertically positioned peg. These pegs, of which there are a large number, are utilized to carry the ware away from the burn-off machine unloading position and the ware is discharged from the pegs by tilting the pegs from their vertically-up position to a position wherein the tumblers will slide off the pegs and then into side engaging guide chutes. Since the ware is required to slide down the chute, it is subject to impact bruising and sliding abrasion which will cause defects in the ware. Another method of handling ware from a "peg table" is shown in United States Patent 2,207,179 wherein the ware is again slid from the pegs into confining, cup-like members which in turn are utilized to convey the ware from a tilted position into an upright position preparatory to transfer onto a moving conveyor. It can readily be seen that use of these prior art devices subjects the ware to considerable impact bruising and sliding abrasion. Also the positioning of the ware over a peg, particularly when the ware is relatively hot, has the tendency of forming checks or thermal stress patterns in the ware due to unequal cooling of the ware caused by contact with the pegs.

With the foregoing in mind, it is an object of this invention to provide a method of and apparatus for handling glass articles released from a "burn-off" machine with a minimum of contact of the ware with the transfer mechanism.

It is another object of this invention to provide apparatus for handling glass articles released from a "burn-off" machine which is adjustable so that it can handle ware of various sizes.

It is an additional object of this invention to provide a method of and apparatus for inverting successively produced glass articles and transferring said articles to a conveyor with a minimum of damage inflicted to the article by way of bruises, abrasion or through impact and sliding.

It is a still further object of this invention to provide apparatus for transferring and inverting successively produced glass articles received from a "burn-off" machine, wherein the articles are loosely confined between a pair of platens that are rotated as a unit about a horizontal axis while moving through an arc of a circle to a position adjacent a moving conveyor.

Other and further objects will be apparent from the following description taken in conjunction with the annexed sheets of drawings wherein:

FIG. 6 is a cross-sectional view taken at line 6—6 of FIG. 1, illustrating the ware sweep out mechanism and its actuating cam;

FIG. 7 is a cross-sectional view taken at 7—7 of FIG. 6;

FIG. 8 is a cross-sectional view taken at line 8—8 of FIG. 1;

FIG. 9 is a cross-sectional view taken at line 9—9 of FIG. 1;

FIG. 10 is a cross-sectional view taken at line 10—10 of FIG. 9; and

FIG. 11 is a schematic, perspective view of the operating mechanisms of the invention with the mounting and support members removed.

Figure 1:
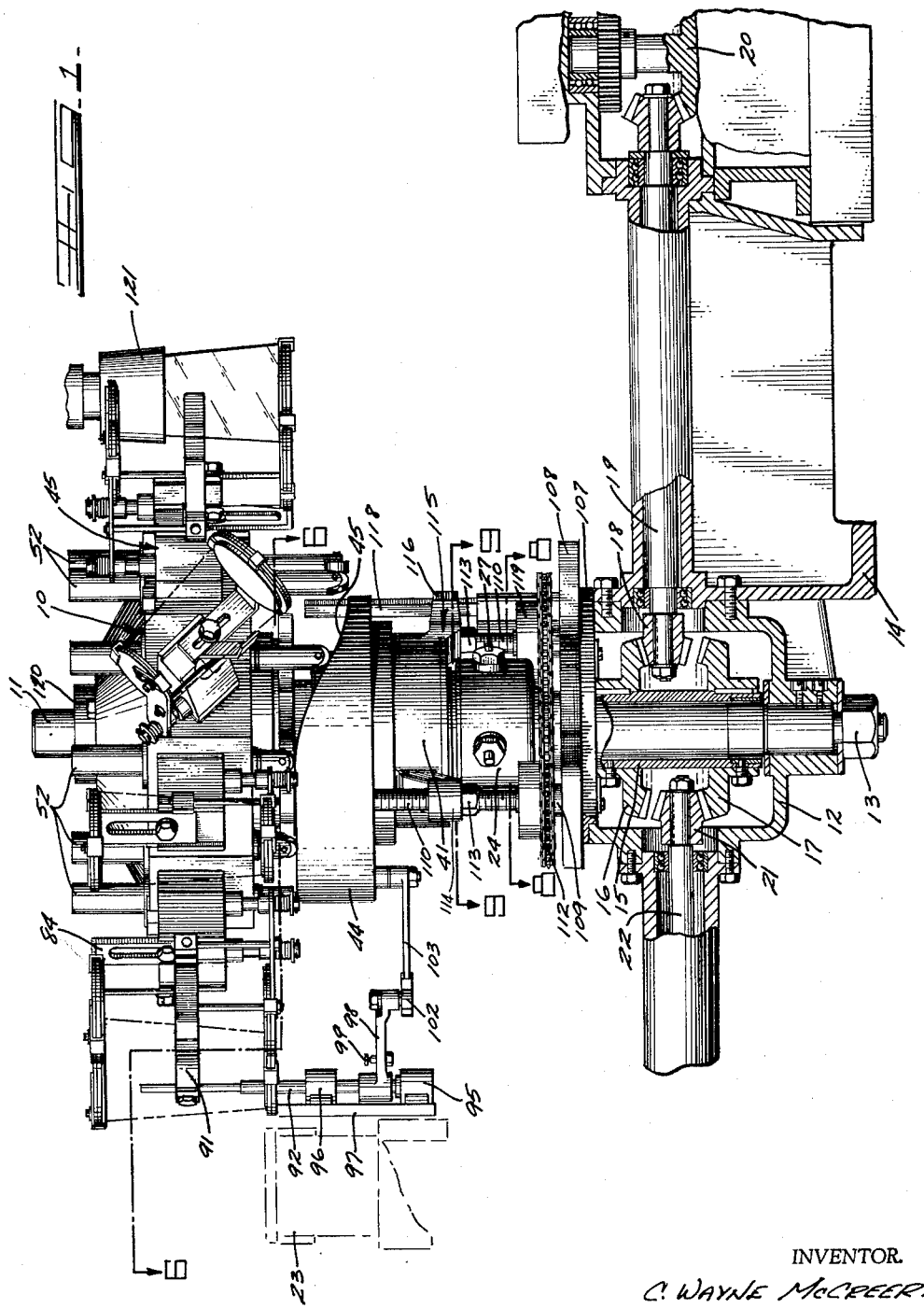
FIG. 1 is an elevational view of the transfer apparatus of the invention.

Referring now to FIG. 1, the relation of the burn-off machine, transfer apparatus and lehr cross conveyor is shown. The transfer apparatus, comprising the present invention, is adapted to receive inverted tumblers issuing from the burn-off machine and upright the same and place them on the lehr conveyor.

Briefly, the burn-off machine is comprised of a plurality of inverted chucks 121, of which only one is shown on FIG. 1. These chucks are designed to hold the tumblers in inverted position during the burn-off operation wherein the moil is removed from the tumblers. The burn-off machine forms no part of the present invention; however, an understanding of its operation is necessary for a proper understanding of the operation of the transfer apparatus of the present invention. The series of burn-off chucks carried by the burn-off machine are moved in an annular path and also are adapted to be raised and lowered for the purpose of picking up ware from the forming machine and for releasing the ware to the transfer apparatus. These burn-off chucks hold the ware by vacuum during the burn-off operation. After the moil has been removed, the chucks will release the ware by depositing the ware onto the transfer apparatus. As previously stated, the prior art transfer devices were generally in the form of "peg tables" and the ware was released over an upright "peg."

Figure 2:
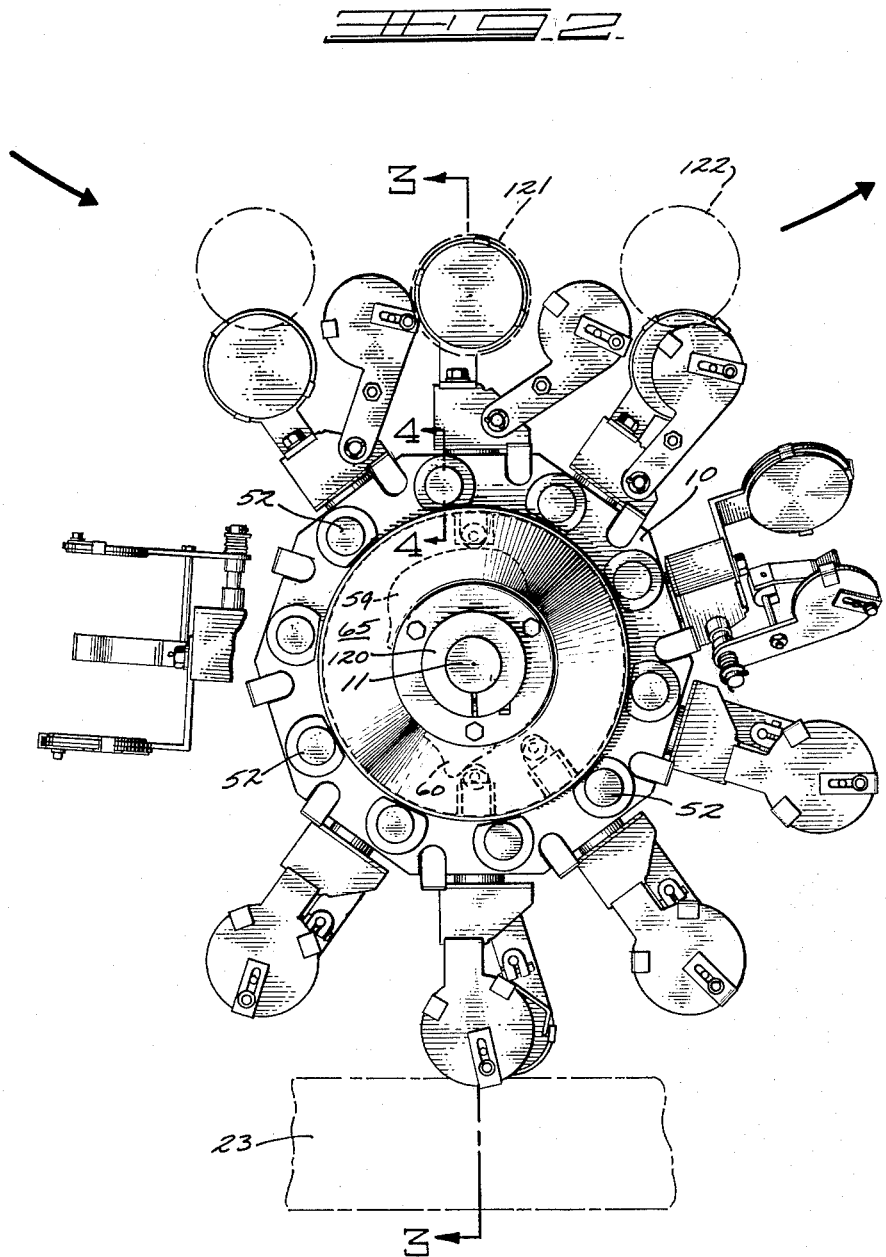
FIG. 2 is a top plan view of the apparatus of FIG. 1.
Figure 3:
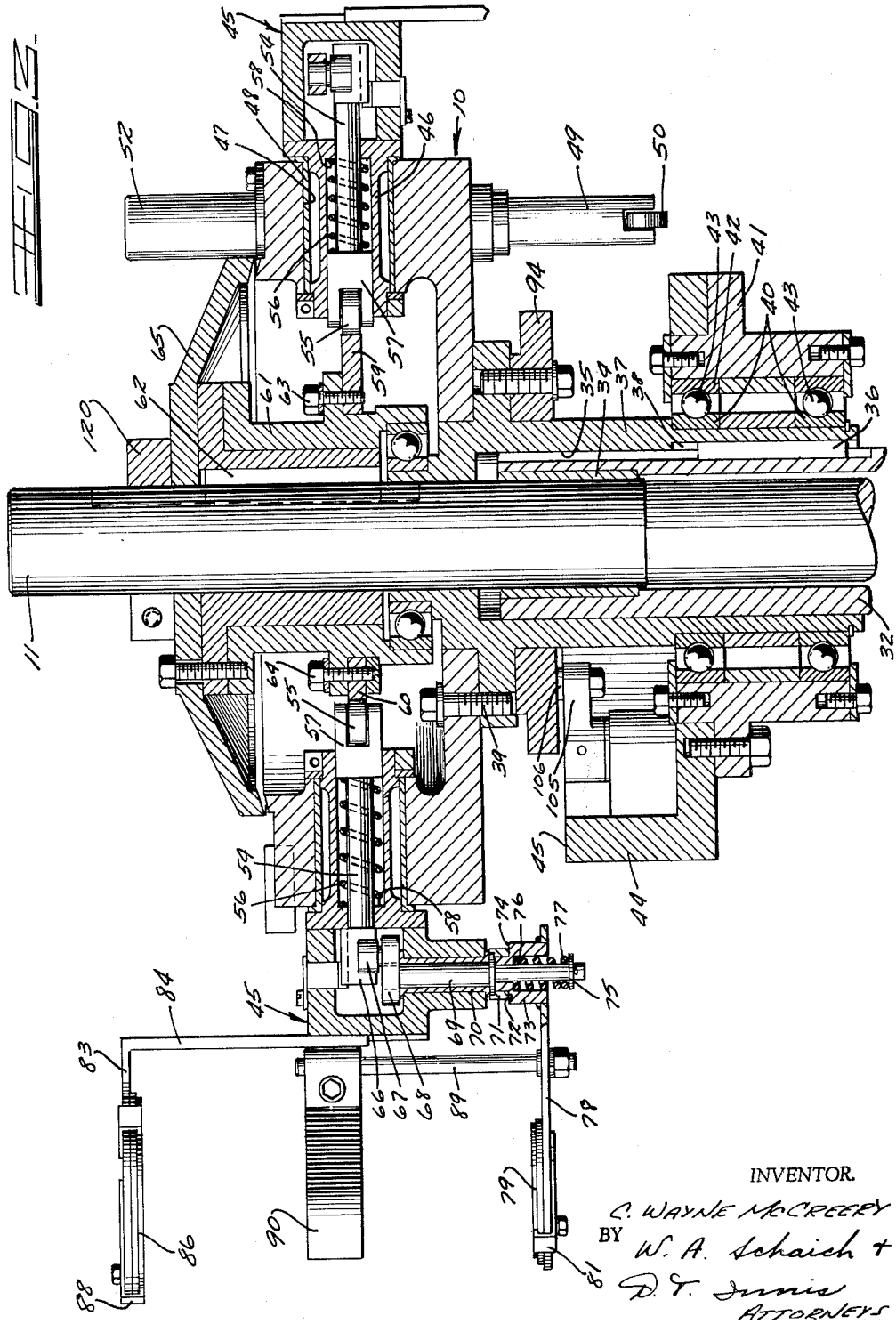
FIG. 3 is a cross-sectional elevation taken at line 3—3 of FIG. 2.

The present invention, as shown in FIGS. 1 and 2, comprises a spider or upper support structure, generally designated 10, mounted for rotary movement about a fixed center post 11. The lower end of the post 11 is bolted to a transmission housing 12 by a threaded nut 13. The transmission housing 12 in turn is bolted to a machine base 14. The post 11 serves as a central support for a sleeve 15. A pair of bevelled ring gears 16 and 17 are fixed to said sleeve and positioned within the transmission housing 12 in vertically spaced relationship. The upper ring gear 16 is adapted to be rotated by a bevelled pinion 18 fastened to the end of a drive shaft 19. The drive shaft 19 is connected at its opposite end to a pinion in engagement with the drive gear 20 of a burn-off machine (not shown). A second bevelled pinion 21, connected to a drive shaft 22, is in mesh with the ring gear 17. Rotation of the shaft 22 is adapted to drive a lehr belt conveyor schematically shown at 23. The sleeve 15, as best shown in FIGS. 9 and 10, is formed into an enlarged housing 24 adjacent its upper end. The housing 24 has a plurality of radial openings 25 formed therein within which a plurality of detent plungers 26 are adapted to slide. The plungers 26 have guide rods 27 connected thereto which extend radially outward through the openings 25 formed in the housing 24. A plurality of threaded cap screws 28 are adapted to close off the openings 25 formed in the housing 24 and serve as housings for springs 29 which serve to urge the detent plungers 26 inwardly of the housing 24. The detent plungers 26 are adapted to seat within complementary slots 30 formed in an annular sleeve member 31. The sleeve member 31 in turn is fixed to a cylindrical shaft or sleeve 32. The sleeve 32 has an annular sleeve bearing 33 recessed therein which serves as the bearing for relative rotation of the sleeve 32 with respect to the post 11. The upper end of the sleeve 32, as best shown in FIG. 3, also carries a sleeve bearing 34 between it and the post 11. The sleeve 32, adjacent its upper end, has a vertical keyway 35 formed therein within which a key 36 is positioned. Co-axially with the sleeve 32 is an annular housing 37 having a complementary keyway 38 within which the key 36 is seated. Thus, rotation of the cylindrical shaft or sleeve 32 will rotate the housing 37. The upper end of the housing 37 supports the spider 10 which is bolted thereto, for example, as shown at 39. The housing 37 carries a pair of bearing races 40. An annular cam support member 41, surrounding the housing 37, has a pair of complementary bearing races 42 which, with ball bearings 43, permit rotation of the housing 37 while the cam support member 41 remains stationary. Bolted to the top of support member 41 is an annular cam 44 whose upper surface 45 has a vertical slope between the pick-up zone and the ware release zone, later to be described.

Figure 5:
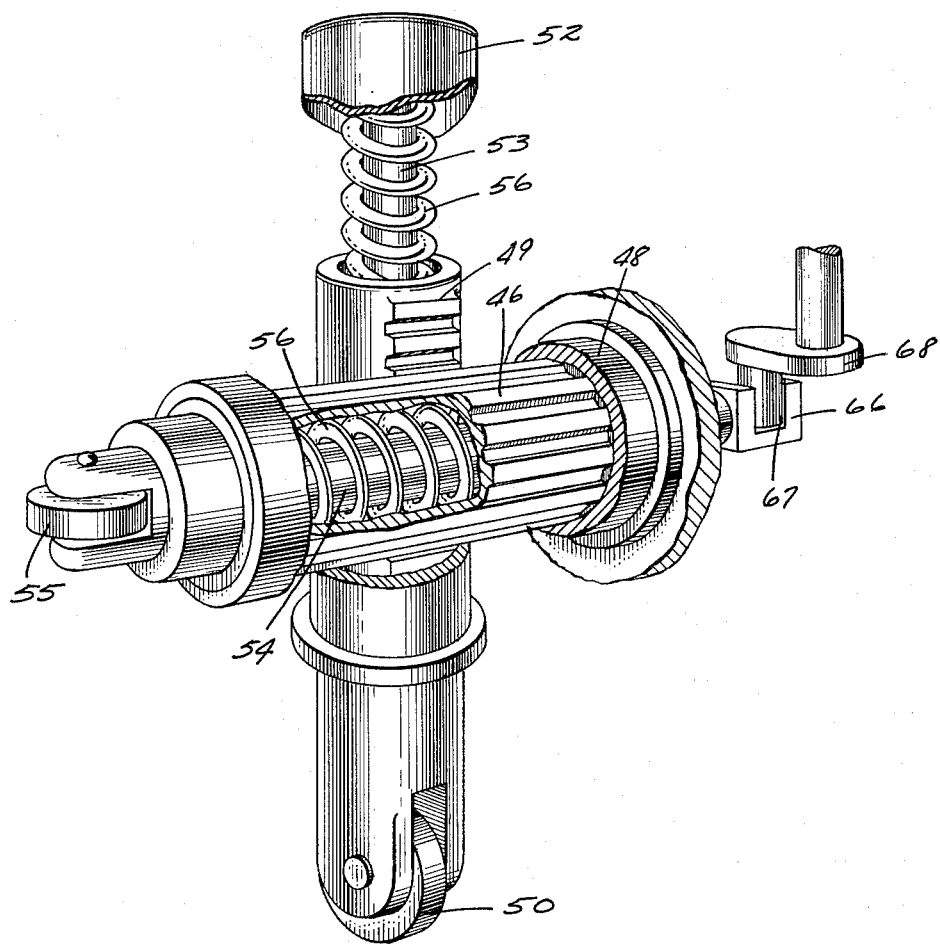
FIG. 5 is a perspective view, with parts broken away, showing the details of the rack and its relationship to one of the ware supporting arms.

The spider 10 has a plurality of arms 45 extending radially therefrom, it being understood that there are 10 of these arms on the present machine. Each arm is comprised of a hollow shaft 46 mounted within an opening 47 formed in the spider 10. A bushing 48 is fixed to the inside of the opening 47 and serves to form the bearing surface for the shaft 46. The shaft 46 has a plurality of circumferentially spaced horizontally extending gear teeth formed therein, as best shown in FIG. 5. The gear teeth formed in the shaft 46 are adapted to be engaged by a vertically extending rack 49. The rack 49, at its lower end, carries a roller 50 which is adapted to follow the upper surface 45 of the annular cam 44.

Figure 4:
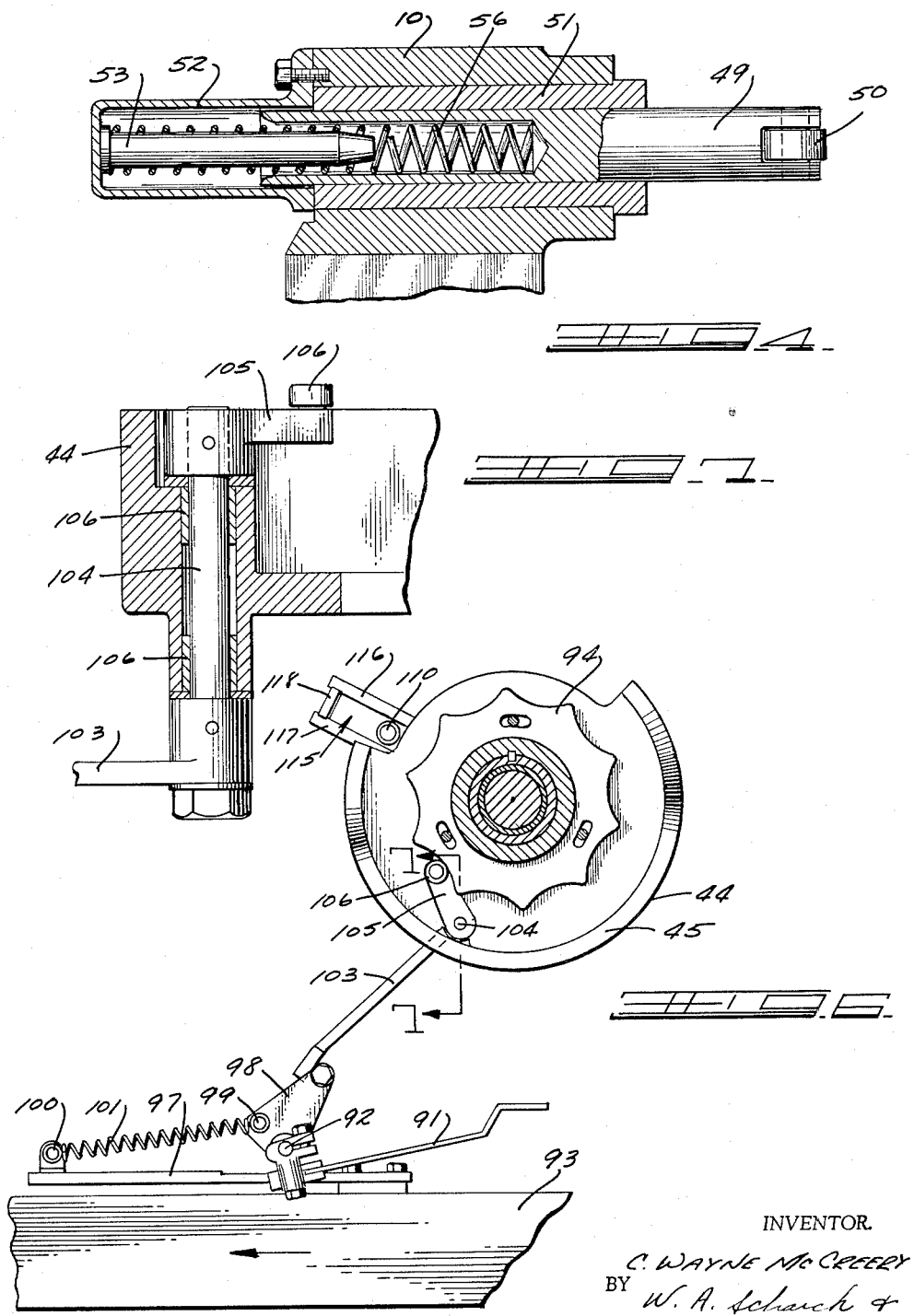
FIG. 4 is a cross-sectional view taken at line 4—4 of FIG. 2, showing the details of the cam actuated drive rack.

As best shown in FIG. 4, the rack 49 extends through a vertical opening formed in the spider 10 which, opening asymptotically, connects with the horizontal opening through which the shaft 46 extends. The vertical opening in the spider 10 has an annular bushing 51 retained therein which surrounds and guides the vertical movement of the rack 49. A spring housing 52 is mounted in the spider 10 in overlying relationship with respect to the rack 49 and carries guide tube 53 fastened to the upper end of the housing and adapted to telescope into the hollow interior of the rack 49. A compression spring surrounds the guide tube 53 and extends between housing 52 and the interior of the rack 49, thus the rack 49 is biased in a downward direction. With the parts arranged as described, it can be seen that rotation of the spider 10 will bring the rollers 50 into contact with the cam 44 causing the racks 49 to be moved vertically upward in sequence, and as a consequence of the upward movement of the racks 49 the shafts 46 will be rotated in a counterclockwise direction as viewed in FIG. 1.

The shafts 46, as best shown in FIG. 3, are connected to the arms 45 and also serve as bearing members for a horizontal cam actuated shaft 54. The horizontal shafts 54 carry rollers 55 on their inner ends which are biased in a radial inward direction by means of springs 56 bearing against the roller mounting blocks 57 and an inner ledge 58 formed within the hollow arm 46. The rollers 55 are adapted to contact and follow cams 59 and 60. The cams 59 and 60 are located in the same horizontal plane at approximately 180° displacement from each other. The configuration of these cams is best shown in dotted lines on FIG. 2 and schematically on FIG. 11. The cams are adjustably connected to a sleeve member 61 which is keyed to the post 11 by a key 62 and, therefore, the cams remain stationary during rotation of the spider 10. The cams are shown as being bolted to the annular member 61 and, as a practical convenience, the cams may be provided with arcuate slots through which the bolts 63 and 64 extend, thus providing means for adjusting the circumferential position of each cam relative to the fixed position of the post 11.

Mounted above the annular member 61 is a cover plate 65 which is adapted to prevent dirt or other extraneous material from finding its way into the interior of the spider 10. As shown in FIG. 2, this cover 65 is bolted to the member 61. The ends of the shafts 54, opposite their cam contacting ends, carry bearing blocks 66. The bearing blocks 66 are in the form of a U shaped member and are adapted to retain crank pins 67 therein. Each crank pin 67 is fixed to a bell crank lever 68. The bell crank lever 68, in turn, is connected to a downwardly extending shaft 69 supported in the arm 45 by a bushing 70 formed therein. Below the bushing 70, as seen in FIG. 3, is an annular member 71 which is fixedly retained with respect to the shaft 69. The annular member 71 is formed with a bottom edge comprised of a pair of downwardly extending portions, as best shown in FIG. 11 at 72. These extending portions 73 are in complemental engagement with the upper surface of a cylindrical member 73. The member 73 has a reduced diameter portion which extends within the annular member 71 and a shoulder portion with an upper surface 74 which is shaped to conform to the lower edge 72 of the member 71. The shaft 69 extends vertically downward through both the members 71 and 74 and carries a washer 75 at its lower end which is retained thereon in any suitable manner, for example, by a cotter pin. Between the washer 75 and an internal shoulder 76 formed within the cylindrical member 73, is placed a compression spring 77 which serves to bias the member 73 into engagement with the member 71. The member 73 has a relatively flat platen 78 fixed thereto which extends generally radially outward with respect to the fixed post 11 of the transfer apparatus. This particular type of connection between the shaft 69 and the platen 78 is a safety feature which, in the event that the platen 78 is prevented from swinging, will permit the shaft 79 to be rotated without fear of damaging the platen 78. Rotation of the shaft under such conditions will rotate the member 71 while member 73 may remain stationary. Obviously the member 73 will move axially of shaft 69 a small amount, against the force of spring 77 but only slight stress will be imparted to the platen 78.

The platen 78 carries a flat ware engaging pad 79 on its ware engaging surface. The pads are adapted to be removably mounted for quick changeover and may be connected to the platens by one fixed clamp 80 and a movable or adjustable clamp 81. As can readily be seen when viewing FIG. 11, loosening of the retaining bolt 82 will permit movement of the clamp 81 upwardly with respect to the platen and thus facilitate removal of the pad from the platen.

A second platen 83, which is normally in axial or vertical alignment with the platen 78, is fixed to the arm 45 by means of a flat, plate-like member 84. The member 84 has a vertical slot formed therein, as best shown in FIG. 1 and FIG. 11. A bolt 85 extending through the slot is threaded within an opening formed in the arm 45 and serves to clamp the member 84 to the arm 45 while permitting relative adjustment of the platen 83 with respect to the platen 78. The platen 83 also carries a ware engaging pad 86. The pad 86 is held to the platen by means of a pair of fixed clamps 87 and an adjustable clamp 88. Thus, it can be seen that the clamp 88 may be shifted with respect to the platen 83 so as to permit removal of the pad 86 from the platen 83 and also facilitate the clamping of different sized pads to the platen 83.

The platen 78 carries a vertical shaft 89 which is bolted to or otherwise fixed to the platen 78, intermediate its length, with the shaft 89 extending generally in the direction of the opposing platen 83. The shaft 89 has a ware retaining bar 90 adjustably clamped to its extending end. The bar 90 has a generally Z-shaped configuration with one end extending outwardly and generally between the two platens 83 and 78. The extending end of the bar 90 is adapted to engage the side of the ware that is positioned between the platens during the period of turnover of the ware and serves to prevent the ware from moving from between the platens.

As the ware is turned over or inverted and reaches the position designated "G" in FIG. 11, the fixed cam 60 will be engaged by the roller 55 and force the shaft 54 in a radially outward direction, resulting in rotation of the shaft 69 and cause the swinging of the platen 78 with respect to the platen 83. This, in effect, results in stopping the lateral movement of the ware in its radial path by causing the platen 78 to, in a sense, be swung backwards. The ware retaining bar 90 also will be swung backwards. With the ware thus supported on the platen 78 in an upright position and with the hesitation in its movement, a transfer paddle 91 will be pivoted about the axis of its supporting shaft 92 in a clockwise direction, when viewed from above, to slide the ware from the pad 79 onto a moving conveyor belt 93. The swinging motion of the transfer paddle 91 is synchronized with the movements of the arms 45 and the platens 83 and 78 carried thereby through the action of a cam 94 which is being rotated with the hollow shaft 32.

As can best be seen in FIG. 3, the cam 94 is bolted to the housing 37 which in turn is keyed to the hollow shaft 32 by the key 36. The cam 94 is a generally circular cam having a plurality of convolutions spaced circumferentially thereabout. The paddle arm is adjustably clamped to the shaft 92 so that the paddle 91 may be adjusted vertically with respect to the ware to be transferred and also the transfer paddle may be adjusted radially with respect to the shaft 92. The shaft 92 is mounted for rotation about its vertical axis in a pair of bearings 95 and 96 whose housings are fixed to an elongated support plate 97. The plate 97 extends parallel to the conveyor and is bolted to the side of the conveyor housing.

A flat, triangular plate 98 is connected adjacent one corner, to the shaft 92. A second apex or corner of the triangular plate 98 carries an upstanding stud 99. The plate 97 also has a vertical extending stud 100 fixed thereto and the studs 99 and 100 serve as the two anchoring means for a tension spring 101 extending therebetween. The spring 101 serves to bias the plate 98 and shaft 92 in a counter-clockwise direction, as viewed from above. Thus the transfer paddle is normally held out of the path of movement of the ware as it is brought into the position designated "G" on FIG. 11. The triangular plate 98 has a roller 102 connected at its third apex with the roller extending below the surface of the plate. This roller 102 is held in engagement with one end of a lever 103 by the spring 101. The opposite end of lever 103 is connected to a vertical shaft 104 extending through the cam 44. The upper end of the shaft 104 is connected to a cam follower lever 105. As can best be seen when viewing FIGS. 3, 6 and 7, the shaft 104 is mounted for rotation within sleeve bearings 106 press fitted within a vertical bushing in the cam 44. The inner end of the cam follower lever 105 carries a roller 106 which is held in engagement with the cam 94 by the spring 101 acting through the plate 98 and lever 103.

With specific reference to FIGS. 1, 6 and 8, the mechanism for mounting the spider or transfer head 10 to the transmission housing 12 will be described. A flat, generally circular, plate 107 serves as the cover for the transmission housing 12 and is bolted to the top thereof. Overlying the plate 107, and fixed thereto, is a rectangular supporting member 108 which is substantially longer than the diameter of the plate 107. The supporting member 108 has bearing pads 109 formed on the upper surface thereof within which threaded shafts 110 are adapted to be rotatably seated. The shafts 110 have sprocket wheels 111 fixed thereto with a continuous chain 112 extending around both sprocket wheels 111, thus insuring equal rotation of both shafts 110 for the purpose which will be understood from the following description.

Each of the shafts 110 carries a locking nut 113 threaded thereon and each shaft extends through internally threaded bosses 114 and 115 which are integral with and extend radially outward from the cam support member 41, as best shown in FIG. 1. The boss 115, in addition to the threaded opening therein, has a pair of parallel, radially extending, portions 116 and 117 which are adapted to embrace the sides of a vertically extending bar 118. The bar 118 is bolted within a vertical recess formed in a supporting flange 119 fixed to the upper surface of the supporting member 108. Therefore, the cam support member 41 is locked against rotation relative to the transmission housing, but vertical adjustment thereof is permitted.

When viewing FIGS. 1 and 3, it can be seen that the casting or cam support member 41 serves as the main supporting member for the spider 10. The spider 10 is normally retained against vertical movement relative to the shaft 11 by a sleeve 120 which is clamped to the shaft 11 and overlies the top portion of the cover member 65. Thus, it can be seen that by loosening the clamping sleeve 120, the spider is free to move vertically upward. This movement is accomplished by rotation of the sprocket wheels 111 after the lock nuts 113 are disengaged from the bosses. Rotation of the sprocket wheels 111 will rotate the threaded shafts 110 and, in effect, raise the cam support member 41, resulting in raising the entire spider or transfer head 10 and associated cams. When the desired height, provided by this adjustment, is achieved the lock nuts 113 may be turned up and the sleeve clamp 120 tightened. In this manner, it can be seen that the entire transfer head or spider 10 and its associated mechanisms may be adjusted vertically to accommodate the transfer device to conveyors having various heights and also to accommodate burn-off machines whose chuck may rotate at nonstandard heights. As previously stated, the bar 118, which is anchored to the supporting member 108 and extends between the extending portions 116 and 117 of the boss 115, will prevent rotation of the stationary parts of the transfer head relative to shaft 11. In this manner the head may be adjusted vertically, but is prevented from rotating about the shaft 11, except as provided by rotation of sleeve 32.

Having described the mechanical details of the invention, a general description of the operation of the device will be described with reference to FIG. 11. As can be seen when viewing this figure, the transfer mechanism of the invention has 10 sets of ware supporting platens positioned at circumferentially spaced intervals designated "A through J."

Beginning the description with the position designated "A," it can be seen that the stationary cam 59 has moved the shaft 54 telescopically within the shaft 46 and, as previously described, this movement of the shaft 54 through linkage connected to the end thereof has rotated the platen 78 in a clockwise direction out of vertical alignment with the other platen. The lower platen 83 remains fixed in its relationship to the axis of the transfer mechanism and, therefore, always extends radially outward from its supporting arm 45.

At position "A," a burn-off chuck 121 carried by the burn-off machine (not shown) is moved in a circular path after burn-off so that the axis of the burn-off chuck will be in vertical alignment with the center of the platen 83. At this time the burn-off chuck supporting mechanism will be operated to lower the burn-off chuck 121 so as to place the ware in approximate contact with the platen 83 and the vacuum, which is maintained within the chuck 121, will be discontinued permitting the ware to be released from the burn-off chuck and transferred to the platen. A second burn-off chuck 122, shown in FIG. 11, has already released its ware and has been retracted or moved vertically upward so that the lower end of the chuck will clear the bottom of the ware which is then sitting on the platen 83 in an inverted position. The burn-off machine, as such, does not form any part of this invention and is a conventional burn-off machine of the type in which ware is received from the forming machine and inserted in the chucks in an inverted position with the chucks successively carrying the ware in inverted position through a burn-off cycle to remove the moil and to form the bead finish on the rim of the tumbler. After completion of the burn-off operation the burn-off chucks, of which there are a plurality, will successively move into and out of the position of the burn-off chuck 121, shown in FIG. 11. The burn-off machine performs the operations of lowering the chucks, cutting off the vacuum and raising the chucks. The arrows on FIG. 11 indicate the movements of the chucks 121 and 122. After the ware has been released to the platen 83 at position "A," it will, by the continuous rotation of the ware transfer head or spider, arrive at position "B" where the cam 59 becomes shallower, thus permitting the shaft 54 to begin moving to the left. Upon further rotation of the spider the shaft 54 will have moved or been retracted completely, as shown at position "C," thus resulting in the swinging of platen 78 into vertical alignment with the bottom of the tumbler and the lower platen 83. At the same time that the platen 78 is swung into alignment, the ware retaining bar 90 will be moved into the position shown and will contact the side of the ware or be closely spaced therefrom. Continued rotation of the spider results in the rack 49 being moved upwardly by the cam 44. Upward movement of the rack 49 rotates the shaft 46 to which the platens are connected and, as shown at position "D," the rack has moved approximately one-half of its vertical travel, thus turning the shaft 46 through a 90° arc. The ware which is loosely retained between the platens by the bar 90 is shown in a horizontal attitude.

For the purpose of clarity in illustrating the mechanism, the platens and arm have been removed at the position designated "E." However, by this time the slope of the cam 44 has reached zero, or is now level and the turn-over of the tumbler or ware is completed.

As the ware moves to the position designated "F," the cam 60 comes into the picture and will force the shaft 54 in a radially outward direction and through the belt crank lever 68 will rotate the platen 78, which now supports the bottom of the tumbler, in a counter-clockwise direction, as viewed from above, about the axis of the shaft 69. During the continuous rotation of the spider and the arms carried thereby, the effect of the movement of the platen 78 in a counter-clockwise direction, as illustrated at position "F," is that the lateral movement of the ware is stopped and the platen remains stationary relative to the conveyor. This stop or pause is accomplished by the shape of one-half of the cam 60. During this time when the platen appears to pause in its generally rotary movement about the axis of the shaft 11, the cam 94 will have swung the cam follower lever 105 in a counter-clockwise direction, as viewed from above. The counter-clockwise rotation of the cam follower lever 105 results in clockwise swinging motion of the transfer paddle 91, thus sliding the ware from the platen 78 onto the surface of the conveyor belt 93. Continued rotation of cam 94 permits the return of the transfer paddle 91 to a position preparatory to sliding the next article from its platen. Thus, it can be seen that the cam 94 synchronously operates the transfer paddle 91.

At the position designated "G," the ware has already been removed from the transfer mechanism and the contour of the cam 60 now slopes inwardly so that the shaft 54 will move radially inward, thus swinging the platen 78 in a clockwise direction relative to the platen 83. When the cam 60 is no longer effective, the platen 78 will again be in vertical alignment with the platen 83, as illustrated at position "H."

Continued rotation of the spider and during the interval of movement of the platen pairs from the position designated "H" to the position designated "I," the surface of the cam 44 dips downwardly, thus permitting the biased rack 49 to move downward in cam following relationship, to revert the platen supporting arm 45. As illustrated at position "I," the rack 49 has moved downwardly through one-half of its travel and the arm 45 has been rotated counter-clockwise about its horizontal axis through a 90° arc. Further rotation of the spider with respect to the cam 44 will result in the rack 49 moving to its lowermost position and the arm 45 will be rotated an additional 90° in a counter-clockwise direction, thus placing the platen 78 vertically above the platen 83. After reversion of the platen carrying arm 45 and upon its movement to the position indicated "J," the shaft 54 will again be brought into contact with the cam 59 and the cycle of operation will be repeated.

Thus, it can be seen that through the 360° rotation of the spider the apparatus of the invention will receive tumblers in inverted position, turn the tumblers about a horizontal axis intermediate their length, successively position the tumblers in an upright attitude so that they may be moved laterally from a supporting platen to a conveyor belt and then revert the ware supporting platens into their original vertical orientation ready for receiving additional tumblers from a burn-off machine.

It should be understood that the speed with which the spider is rotated and, therefore, the number of tumblers per time interval which the device may handle, is limited only by the frequency with which the burn-off machine is capable of bringing tumblers to the apparatus of the invention.

While the apparatus has been described primarily as handling tumblers, it should be kept in mind that the principles of the invention are equally applicable to the handling of other articles which should be handled gently in order to prevent the formation of defects therein.

Other and further modifications may be resorted to within the spirit and scope of the invention as set forth in the appended claims.

I claim:

1. A method of transferring and inverting glassware from a burn-off machine to a conveyor comprising the steps of moving a ware support platen into underlying relationship with a burn-off chuck to receive the ware released therefrom in inverted position, continuing the movement of the ware support platen in an arcuate path while supporting the ware, moving a second platen in a plane parallel to the plane of movement of the support platen into overlying, spaced relationship with respect to the opposite end of the ware, rotating the platens as a unit about an intermediate axis while confining the ware to the area therebetween thereby inverting the ware to an upright position, moving the uprighted ware to a position adjacent a conveyor and laterally transferring the ware from the second platen to the conveyor.

2. In a method of transferring hot glassware from a burn-off machine to a continuously moving conveyor wherein the ware is released from the burn-off machine in inverted position; the steps of supporting the released ware in its inverted position on a first horizontal member, swinging a second horizontal member in a horizontal plane into overlying spaced relationship with respect to the ware, simultaneously therewith swinging a side engaging member into contact with the side of the ware, rotating all three members, as a unit, about a horizontal axis with the side engaging member retaining the ware between the first and second horizontal members, moving the ware and members during the rotation thereof to a position adjacent a conveyor and sliding the ware from the second member onto the conveyor.

3. A device for transferring tumblers and like articles comprising a vertical post, a spider mounted on said post for rotation in a horizontal plane, a plurality of radially disposed arms mounted on said spider for revolution with said spider about the vertical axis of said post, a pair of vertically spaced article supporting platens carried by each arm and being adapted to loosely retain an article received therebetween in inverted position, one of said pairs of platens being fixed to the end of said arm, the other platen of said pair of platens is pivotally supported on said arm for horizontal swinging movement with respect to said arm, said arms each being pivotally mounted on said spider for rotation about the horizontal axis of each arm, means operable upon revolution of said arms about the axis of said post for causing the same to turn over in their respective planes of swinging movement, a circular cam connected to the undersurface of said spider, means in engagement with said circular cam and responsive to the contour of said cam for laterally shifting the upright articles from between said platens to a conveyor and means for revolving said spider about the vertical axis of said post.

4. In a tumbler transfer apparatus, a spider mounted for rotation about a vertical axis, a plurality of arms extending radially from the spider, a rod radially slidable in each arm, first cam means mounted within said spider in engagement with the inner ends of said rods for controlling the radial movements of said rods, means urging the rods into cam following engagement, a pinion connected to each arm, a vertically disposed rack slidably mounted in said spider and in engagement with said pinion, second cam means mounted beneath said spider, said second cams having an annular cam surface in vertical alignment with the axes of said racks, means mounted on said spider for maintaining said racks in engagement with said second cam controlling the vertical movements of said rack, a tumbler supporting platen connected to each arm and movable therewith, a swinging platen pivotally supported by said arm, means connecting said rod to said swinging platen for moving the same into and out of vertical alignment with said supporting platen and means for rotating said spider about the vertical axis.

5. The apparatus as defined in claim 4 further including, a fixed base member, a vertically extending shaft connected to said base about which said spider rotates, and means for adjustably connecting said spider to said shaft whereby said spider may be raised or lowered in height with respect to said base.

6. The apparatus as defined in claim 4 wherein the ware receiving platens are connected to their respective arms by a vertical member having a slot therein, whereby said platens may be vertically adjusted to accommodate ware of varied heights.

7. The apparatus as defined in claim 4 further including, a first rotatably mounted sleeve connected to said spider, a second sleeve in axial alignment with said first sleeve, means for rotating said second sleeve and coupling means connected between said sleeves whereby said second sleeve rotates said first sleeve in synchronism.

8. The apparatus as defined in claim 7 wherein said coupling means comprises a plurality of radially biased detents carried by one sleeve and engageable with slots formed in the other sleeve whereby excessive force transmission is prevented in the event of stoppage of the transfer apparatus.

9. Apparatus for transferring tumblers and like articles from a burn-off machine to a conveyor comprising a rotatable spider, a plurality of horizontally disposed ware supporting platens extending radially outward from said spider, a plurality of overlying platens pivotally connected to said spider, means for pivoting said overlying platens into and out of vertical alignment with respect to said ware receiving platens, means responsive to rotation of said spider for swinging said upper platen into alignment with the tumbler and lower platen, means responsive to continued rotation of said spider for rotating both platens as a unit about a horizontal axis intermediate said platens and means responsive to further movement of said spider for displacing said platens with respect to each other and transferring the ware from the pivoting platen onto a moving conveyor.

10. Apparatus for transferring and inverting glassware from a burn-off machine to a conveyor comprising a spider, a plurality of radially extending arms rotatably mounted with respect to said spider, a ware receiving platen mounted on each arm and adapted to receive a glass article released thereto in inverted position, a second platen connected to said arms spaced vertically above said receiver platens, means pivotally mounting said second platen with respect to said arm, a stationary horizontal cam in alignment with said arms, a cam follower connected to said second platen and biased into contact with said cam, pinion means formed on said arms, vertically shiftable rack means carried by said spider in engagement with said pinion means, an annular vertical cam having its cam surface in alignment with said racks whereby rotation of said spider with respect to said cams will result in retaining the tumblers between the platens and said platens are rotated as a unit about the horizontal axis of said arm.

11. The apparatus as defined in claim 10 further including, a fixed base member, a vertically extending shaft connected to said base about which said spider rotates, and means for adjustably connecting said spider to said shaft whereby said spider may be raised or lowered in height with respect to said base.

12. The apparatus as defined in claim 10 wherein the ware receiving platens are connected to their respective arms by a vertical member having a slot therein, whereby said platens may be vertically adjusted to accommodate ware of varied heights.

13. The apparatus as defined in claim 10 further including, a first rotatably mounted sleeve connected to said spider, a second sleeve in axial alignment with said first sleeve, means for rotating said second sleeve and coupling means connected between said sleeves whereby said second sleeve rotates said first sleeve in synchronism.

14. The apparatus as defined in claim 13 wherein said coupling means comprises a plurality of radially biased detents carried by one sleeve and engageable with slots formed in the other sleeve whereby excessive force transmission is prevented in the event of stoppage of the transfer apparatus.

15. Apparatus for transferring and inverting articles from one location to another comprising a spider, a plurality of radially extending arms rotatably mounted with respect to said spider, a ware receiving platen mounted on each arm and adapted to receive a glass article released thereto in inverted position, a second platen connected to said arms spaced vertically above said receiver platens, means pivotally mounting said second platen with respect to said arm, a stationary horizontal cam in alignment with said arms, a cam follower connected to said second platen and biased into contact with said cam whereby said follower will pivot said second platen into and out of said vertical alignment with said ware receiving platen, in predetermined sequence, pinion means formed on said arms, a plurality of vertically shiftable racks carried by said spider in engagement with said pinion means, an annular stationary cam having its cam surface in alignment with the path of travel of said racks whereby rotation of said spider with respect to said cams will result in confining the articles between the platens and said platens are rotated as a unit about the axis of said arm.

16. The apparatus as defined in claim 15 further including, a fixed base member, a vertically extending shaft connected to said base about which said spider rotates, and means for adjustably connecting said spider to said shaft whereby said spider may be raised or lowered in height with respect to said base.

17. The apparatus as defined in claim 15 wherein the ware receiving platens are connected to their respective arms by a vertical member having a slot therein, whereby said platens may be vertically adjusted to accommodate ware of varied heights.

18. The apparatus as defined in claim 15 further including, a first rotatably mounted sleeve connected to said spider, a second sleeve in axial alignment with said first sleeve, means for rotating said second sleeve and coupling means connected between said sleeves whereby said second sleeve rotates said first sleeve in synchronism.

19. The apparatus as defined in claim 18 wherein said coupling means comprises a plurality of radially biased detents carried by one sleeve and engageable with slots formed in the other sleeve whereby excessive force transmission is prevented in the event of stoppage of the transfer apparatus.

References Cited by the Examiner
UNITED STATES PATENTS

| | | |
|---|---|---|
| 2,415,997 | 2/47 | Eldred. |
| 2,417,472 | 3/47 | Dorff _____ 198—210 |
| 3,025,638 | 3/62 | Krawetzke. |
| 3,034,822 | 5/62 | Eldred. |
| 3,100,051 | 8/63 | Schreiber. |

HUGO O. SCHULZ, *Primary Examiner.*

MORRIS TEMIN, *Examiner.*